May 5, 1936.　　　J. W. HARGRAVE　　　2,039,899
HANDLE CONNECTER
Filed July 13, 1935

Inventor
J. W. Hargrave

Attorney

Patented May 5, 1936

2,039,899

UNITED STATES PATENT OFFICE 2,039,899

HANDLE CONNECTER

James W. Hargrave, Mertzon, Tex.

Application July 13, 1935, Serial No. 31,268

5 Claims. (Cl. 306—30)

This invention is directed to an improvement in handle connections for various implements, such as hoes, rakes, shovels and the like, wherein the handle may be readily connected or disconnected, with the handle part of the connection so rigidly secured to the handle as to absolutely insure perfect rigidity of parts with impossibility of separation or relative movement, while at the same time permitting convenient separation when desired.

In ground working implements, particularly where the handle proper is desirably of wood, there is in a comparatively short time a loosening of the handle with respect to the implement due to the deteriorating effect of the water in the wet earth which accumulates at the juncture of the handle and its connection with the implement shank. Furthermore, under the strain of use and hard usage to which these implements are subjected, there is almost invariably a loosening of the handle relative to the shank and a consequent failure of function.

The primary object of the present invention is to provide a metallic connection between the shank of the implement and the wooden handle, with such connection made up of two parts, one integral with or welded to the shank, and the other secured to the handle proper. The parts are threaded or otherwise formed in part for inter-connection to be thus secured against disconnection except when desired, and the handle part so rigidly connected to the handle proper as to prevent any possibility of separation or relative movement when in use; the securing means providing, however, for ready separation of the handle proper when necessary or desirable.

The invention is illustrated in the accompanying drawing, in which.

Figure 1:
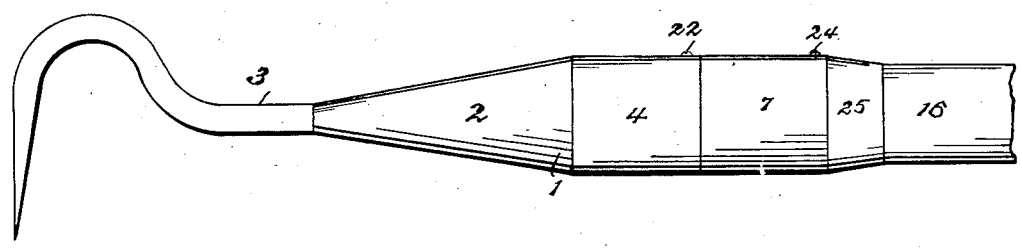
Figure 1 is a view in elevation showing the connection, the handle being broken off and the implement proper being omitted.
Figure 2:
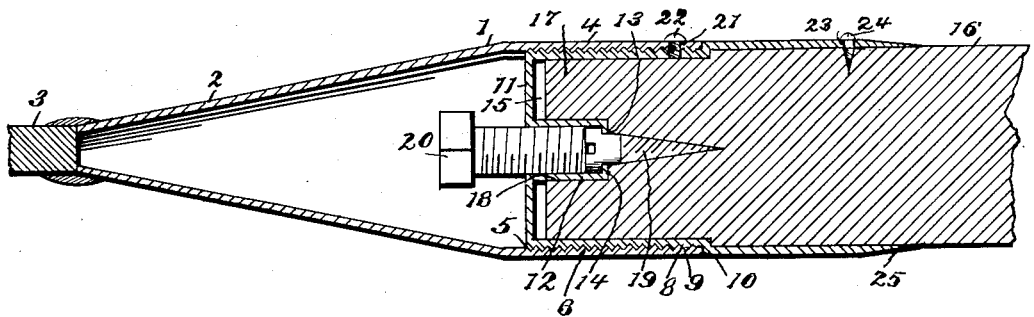
Figure 2 is a longitudinal sectional view through the connection.

The improved connection includes a socket element 1 of hollow form, the lower portion 2 of which tapers to an interior diameter capable of snugly receiving the shank 3 of the implement, the juncture between these parts being welded or brazed to provide that the socket element 1 is an integral part of the implement shank, or the implement and socket 2 may be formed in one piece.

The upper portion 4 of the socket element 1 is substantially cylindrical, with the wall of reduced thickness as compared with the wall of the conical part to provide an abrupt shoulder 5 at the juncture of the parts. The inner surface of the wall of the cylindrical part 4 is threaded throughout its length, as at 6.

The handle part of the connection is in the form of a ferrule 7, the upper portion of which is cylindrical and of a diameter to correspond with the portion 4 of the socket 1. The lower portion of the ferrule is of reduced diameter to provide a circular projection 8 of a diameter to fit within the section 4 of the socket, with the exterior surface of the projection threaded at 9 to cooperate with the interior threads 6 of the part 4. The projection 8 is of a length corresponding to that of the part 4, so that the free end of the projection 8 bears squarely against the shoulder 5 at the juncture of the parts 2 and 4 of the socket, while the free upper end of the part 4 bears squarely against a shoulder 10 formed at the juncture of the parts 7 and 8. Thus when the ferrule is threaded into the socket, there is a smooth exterior surface throughout the length of the connection, the joint at the shoulder 10 being carefully fitted to prevent the possibility of water or the like passing therethrough to reach the wooden handle.

The free or lower end of the projection 8 is closed by a wall 11 and integral with this wall and extending inwardly of the projection is an annular wall 12 defining a hollow nipple which opens at its lower end through the wall 11. The relatively upper or inner end of the nipple is formed with an opening 13 of reduced diameter as compared with that of the nipple, thereby providing an edge flange 14 surrounding the opening.

The nipple is of reduced diameter as compared with the interior diameter of the projection 8, thereby providing a space 15 between the nipple and the interior surface of the projection 8.

The handle proper 16, which while preferably of wood may be made of any appropriate material, is formed to accurately fit in the ferrule 7, being for this purpose of reduced diameter at its lower end to engage the shoulder 10 formed interiorly of the ferrule at the juncture of the parts 7 and 8, with the lower portion of the handle 17 formed to accurately fit in the projection 8, the extreme lower end of the handle being formed with an opening 18, as by appropriate boring, to accurately receive the nipple 12.

The exterior surface of the handle in that portion with which the ferrule cooperates accurately fits the interior conformation of the ferrule, to thus at once establish a cooperation in which neither the handle nor ferrule is permitted lateral play. The ferrule and handle are rigidly secured together against possibility of separation except when desired through the medium of a wood screw 19 passed through the opening 13 and taking into the wood of the handle, the head of the wood screw being limited to the flange 14. A set-screw 20 is then threaded into the nipple, which is interiorly threaded for the purpose, and clamped tightly against the head of the wood screw 19. The portion 4 of the socket and the projection 8 of the ferrule are formed with openings 21 designed to register when the parts are in proper correlation, the walls of the openings being threaded to receive a machine screw 22 for preventing relative rotation of the parts. The sleeve 7 is formed with an opening 23 to receive a wood screw 24 which, taking into the handle, provides a further security against separation of the parts. The exterior surface of the upper end of the sleeve 7 of the ferrule is gradually reduced in thickness to merge substantially into the exterior surface of the handle 16 to avoid a projection or shoulder on which wet earth or other refuse may lodge.

The construction provides an extremely rigid connection between the handle and implement shank because the set-screw positively precludes any loosening of the wood screw in the handle while at the same time the accurate fitting of the handle into the ferrule insures against any lateral loosening of the handle and ferrule. The cooperating threaded parts of the socket and ferrule are of such length as to insure rigidity when connected, and the locking screw 22 prevents relative rotation unless desired.

While the attachment may be used for any handle carrying implement, it is more particularly designed for ground working implements. With such implements, there is an accumulation of dirt and other refuse about the connected parts which, particularly where connecting screws are used, soon tends to a rusted condition of the screw and the practical impossibility of subsequent removal. Furthermore, this wet earth and refuse will, in the usual connection, readily reach the wooden handle with a subsequent softening or rottening of the wood and the loosening of the connections. With the present connection, these disadvantages are entirely obviated. The set-screw 20 and wood screw 19 are thoroughly and completely protected against any wet earth or other refuse, and thus may be readily removed and replaced whenever desired, no matter how long the implement may have been in use. The close fitting joint between the ferrule and socket, and the avoidance of any projection between the upper edge of the ferrule and the handle proper precludes any possibility of wet earth or refuse reaching the handle proper within the ferrule.

The improved connection, therefore, provides a rigid immovable connection between the parts, with the handle carrying part rigidly secured to the handle proper and the securing means positively and completely protected against contamination to permit their convenient manipulation when desired or necessary. The parts of the connection are preferably of metal of sufficient gauge to insure rigidity and the various threads are preferably of rather fine character to insure accuracy in fitting and capability of a slight binding action when firmly connected.

The implement I and socket portion 2 may be made in one piece in lieu of welding, so that if desired the tool may be screwed on or otherwise fitted on a handle and secured against turning by a screw or pin.

What is claimed to be new is:

1. A means for connecting an implement and a separable handle, comprising a socket to be connected to the implement, a ferrule to fit over the end of a handle, the socket and ferrule being formed in part for interconnection, the end of the ferrule being formed with an opening for the introduction of a screw to take into the end of the handle, and a set-screw having threaded engagement with the end of the ferrule to overlie and prevent movement of the first-mentioned screw when the latter is in position.

2. A means for connecting an implement and a separable handle, including a socket to be connected to the implement, and interiorly threaded at the end remote from the implement, a ferrule closed at one end and open at the opposite end to permit the ferrule to be placed on the end of a handle, the exterior of the ferrule adjacent the closed end being threaded for cooperation with the threaded portion of the socket, the closed end of the ferrule being formed with an opening to permit the insertion of a wood screw to take into the end of the handle, the wall of the opening being threaded, and a set-screw threaded into said opening to engage and prevent movement of the wood screw when the latter is in position, the set-screw and wood screw being protected against water, damp earth and the like by the socket.

3. A means for connecting an implement and a separable handle, including a socket of hollow form welded at one end to the implement shank, open at the opposite end and interiorly threaded, a ferrule closed at one end and open at the other to be fitted over the handle, that portion of the ferrule adjacent the closed end being exteriorly threaded to cooperate with the threaded portion of the socket, an interiorly threaded nipple extending inwardly from the closed end of the ferrule, the inner end of the nipple being formed with an opening of less diameter than the interior diameter of the nipple, a wood screw to be passed through said opening to take into the end of the handle, and a set-screw threaded into the nipple and bearing upon the head of the wood screw to prevent possible movement of the latter after application thereof.

4. A handle implement connecter including a hollow socket to be secured to the shank of the implement and interiorly threaded, a ferrule closed at one end and open at the other, a handle fitted into the open end of the ferrule and substantially contacting with the closed end, an interiorly threaded nipple integral with the closed end and extending into an opening in the handle when the latter is in position, the end of the nipple remote from the closed end of the ferrule being formed with an opening of less diameter than the interior diameter of the ferrule to provide an edge flange surrounding the opening, a wood screw fitted through the opening in the nipple and taking into the end of the handle, the seating movement of the screw being limited by the flange, and a set-screw threaded into the nipple and bearing against the head of the wood screw to prevent independent movement of the latter when in applied position.

5. A construction as defined in claim 4, wherein the threaded portion of the ferrule completely seals the open end of the socket and wherein the hollow socket completely houses and protects the set-screw and wood screw.

JAMES W. HARGRAVE.